Figure 1:
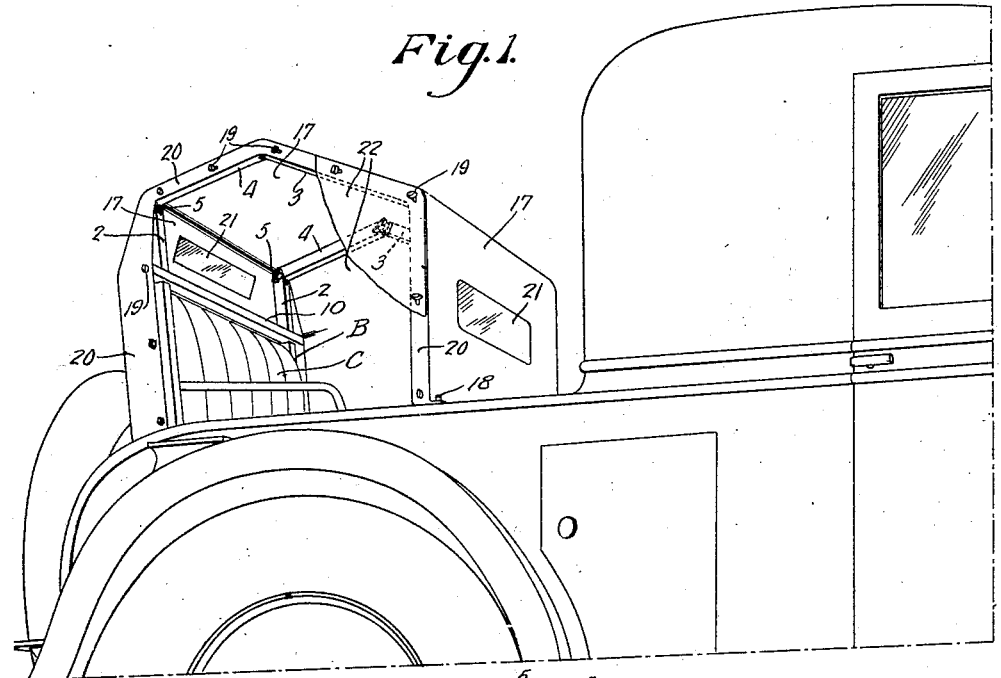

Jan. 7, 1930.  L. A. BAUM  1,742,629
RUMBLE SEAT TOP
Filed May 18, 1928  2 Sheets-Sheet 1

INVENTOR
Leopold A. Baum.
BY
ATTORNEYS

Jan. 7, 1930.　　　L. A. BAUM　　　1,742,629
RUMBLE SEAT TOP
Filed May 18, 1928　　2 Sheets-Sheet 2
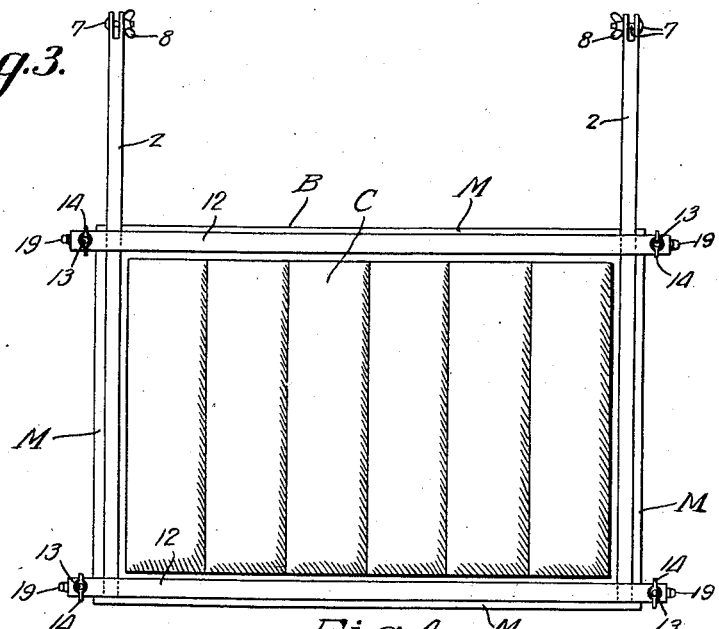
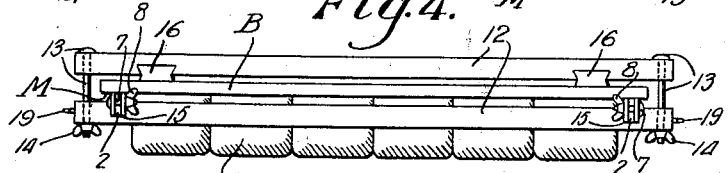
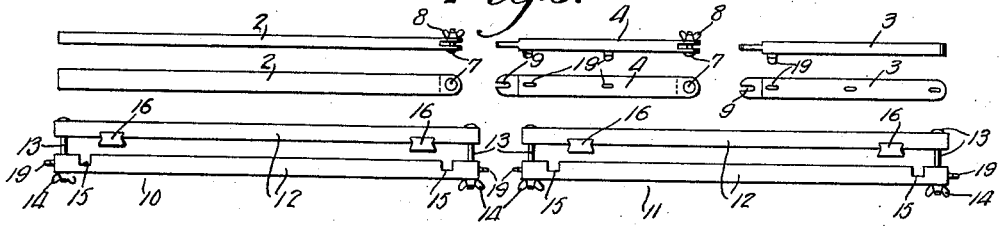
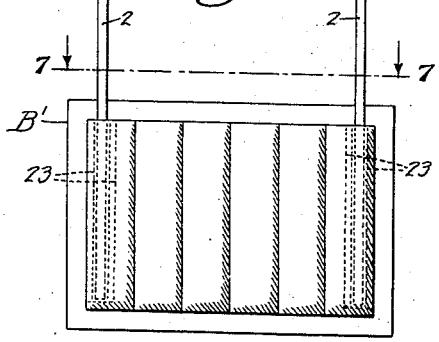
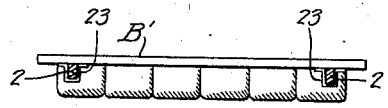
INVENTOR
Leopold A. Baum
BY
ATTORNEYS Patented Jan. 7, 1930

1,742,629

UNITED STATES PATENT OFFICE

LEOPOLD A. BAUM, OF NEWARK, NEW JERSEY

RUMBLE-SEAT TOP

Application filed May 18, 1928. Serial No. 278,861.

The main object of the present invention is to provide an improved top structure for automobile rumble seats.

Another object of the invention is the provision of a top structure for rumble seats which may be readily attached thereto and readily detached and collapsed into a compact form for storage, whereby it will not obstruct the closing of the rumble seat.

A further object of the invention is to provide a top of this character which will provide maximum protection to the occupants of the seat.

Other objects will appear hereinafter.

Figure 2:
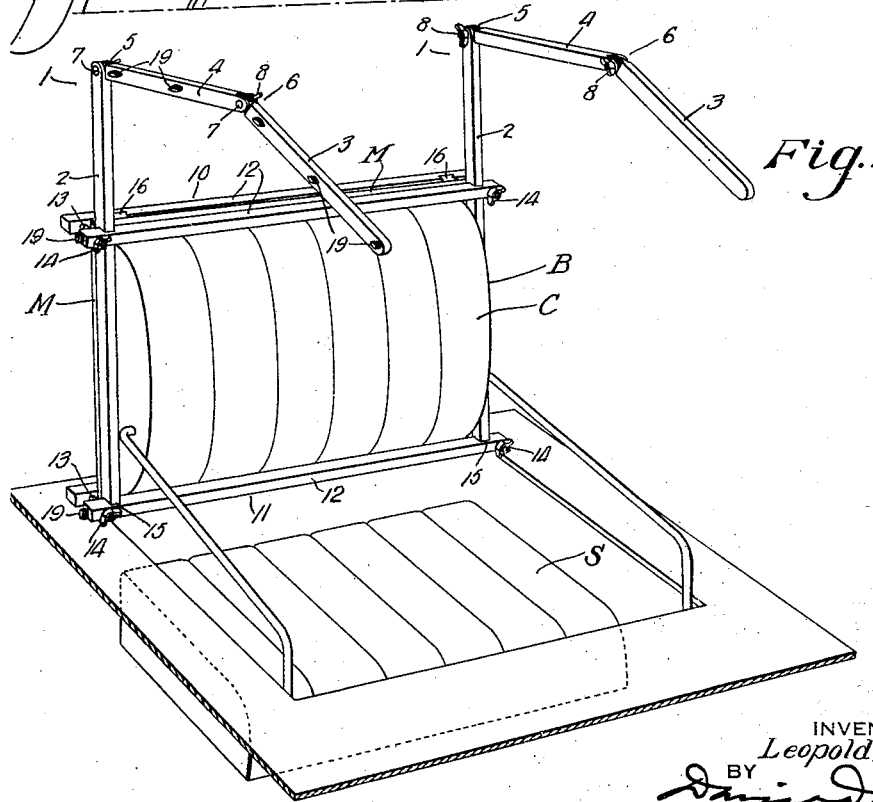

In the drawings:

Fig. 1 is a perspective view of the rear portion of an automobile provided with a rumble seat and equipped with my improved top structure;

Fig. 2 a perspective view of the rumble seat and the frame of the top structure;

Fig. 3 a front elevation of the back of the seat and the frame members attached thereto;

Fig. 4 an upper edge view of the parts shown in Fig. 3;

Fig. 5 a group view of the collapsed frame;

Fig. 6 a front view of the back of a rumble seat showing a modified mounting for the top frame; and Fig. 7 a horizontal section taken on the line 7—7 of Fig. 6.

In its preferred form my improved top structure is designed for attachment to the folding back with which automobile rumble seats of standard form are provided. In the drawings the seat proper is designated S and occupies a depressed position in a cock-pit formed in the rear portion of the car body. The back B of the seat is hinged at the rear edge of the hatchway of the pit and is adapted to fold down and close the hatchway when the seat is not in use. A cushion C covers the central area of the back and the latter is formed with a rigid margin M extending entirely around the cushion and forming a flange for sealing the hatchway. One form of my top structure is designed for attachment to this rigid margin.

The top structure includes a pair of frame members 1. Each member is formed of straight, rigid sections connected together end to end. There are two end sections 2 and 3 and an intermediate section 4. These sections are connected together by two hinging and clamping joints 5 and 6. To form the joint 5 the section 2 is forked and apertured at one end and has a bolt 7 extending through the apertures and across the fork. Threaded upon the bolt is a winged nut 8. The intermediate section 4 is formed with a tongue which is adapted to fit in the said fork and is notched as at 9 to hingedly and detachably connect with the clamping and pivot bolt 7. The joint 6 is similarly formed, the connected ends of the intermediate section 4 and the end section 3 being formed with a fork and a notched tongue respectively and joined by a bolt and winged nut.

The sectional frame members are attached to the seat back B by two clamping frames 10 and 11 respectively. Each section is formed of a pair of straight rigid bars 12 of slightly greater length than the width of the back B of the seat and arranged parallel. The bars are apertured adjacent their ends to receive clamping bolts 13 which connect the bars together and are provided with winged nuts 14. Inwardly of the bolts 13, one of the bars 12 is formed with recesses or notches 15 at its inner side edge. The other bar of the pair has fixed to it two longitudinally spaced rubber pads or cushioning members 16 which project from its inner side edge. These two clamping frames 10 and 11 are adapted to longitudinally embrace the upper and lower edges of the back B with the pads 16 bearing upon the rear face of the back, and the recesses 15 of the two frames in vertical alinement along the side spaces of the margin M at opposite ends of the cushion. The recesses 15 are formed to fit the sections 2 of the frame members, each of said sections is inserted downwardly through alining recesses, and the nuts 14 of the clamping bolts 13 are tightened to draw the clamping bars 12 toward each other and firmly clamp the sections 2 against the rigid margin M of the back B. The pads 16 bear against the varnished rear surface of the back to hold the rear bars of the clamping frame out of contact with said surface and prevent scratching thereof. The clamped frame sections 2 are materially longer than the height of the seat back and the connected sections 3 and 4 are supported in elevated positions at the upper ends of the sections 2. All of these sections are shown as square or rectangular in cross section and this is true also of the recesses 15 which receive the frame sections 2 so that the latter are held against turning. The sections 3 and 4 are held forwardly extended over the seat S, in proper positions to support a canopy, by tightening the clamping nuts 8 at the hinge connections.

The canopy is in the form of an elongated sheet 17 of waterproof material. It extends upwardly at the rear of the back B, along the upright sections 2, forwardly along the sections 3 and 4 and then downwardly from the forward end of the section 3 to the automobile body. Here it is preferably fastened in any suitable manner as indicated at 18 and by adjusting the sections 3 and 4 at their hinge connections it can be properly stretched. The canopy is detachably fastened to the various frame members in any suitable manner as by buttons 19 which engage in buttonholes formed in inturned margins 20 which extend along the side edges of the canopy. At its front and rear vertical portions the canopy is provided with transparent window panels 21. The space defined by the frame members and the canopy is closed at the sides by side curtains 22 of waterproof material. These curtains are detachably held in any suitable manner as by the buttons 19 engaging in buttonholes in the curtains.

The form of top structure described is readily attachable to a standard rumble seat by mounting the clamping frames 10 and 11 upon the rigid marginal spaces upon the back of the seat, inserting the upright frame sections through said clamping frame, assembling the frame sections 2, 3 and 4 and mounting the canopy and side curtains in place. The occupants of the rumble seat are then thoroughly protected from the elements. By tightening the clamping nuts 7 of the canopy frame the latter is rendered rigid. If it is desired to use the top for merely a sun shade the curtains can be left off and the front end of the canopy folded back. Also, if no top covering is required, the canopy and the sections 2 and 3 may be detached from the upstanding clamped sections 2 and removed. The sections 2 and the clamping frames 10 and 11 need be removed only when the back B of the seat is to be folded down. The top is constructed throughout of strong, simple, inexpensive parts. Practically all of the parts may be separated and they are also straight so that the structure may be entirely collapsed into a very compact form for storage. The various parts are easily assembled for the erection of the top.

In Figs. 6 and 7 is shown a modified form of mounting for the canopy-supporting frame members 1. Here the back B' of the seat is specially constructed for supporting said frame members, and the clamping frames 10 and 11 employed in the previous form are omitted. Within the back B' between the cushion and the rigid panel are mounted two concealed socket members 23. These members are located near the opposite edges of the cushion and define upwardly opening sockets to removably receive the lower ends of the frame sections 2 and hold them erect. If found necessary suitable means may be provided to secure the sections 2 within the sockets.

While I have shown and described two practicable and desirable forms of my invention I do not wish to be limited strictly to this disclosure but reserve the right to make such changes in structure and application as will lie within the scope of the claims.

What I claim is:

1. A detachable and collapsible top structure for an automobile rumble seat of the type provided with a back including a cushion and a rigid margin extending around the edges of the cushion, comprising a plurality of canopy-supporting members each formed of a plurality of rigid bar sections hinged together end to end; a pair of detachable clamping frames formed to extend horizontally across the back adjacent the upper and lower edges thereof to engage said rigid margin and removably support an end section of each frame member upright and extended above the seat back; clamping means carried by said members at their hinge connections to releasably hold the other sections rigid and extended forwardly from the upper ends of said upright supported sections in canopy-supporting positions; and a canopy supported by said structure and extending over the seat.

2. A detachable and collapsible top structure for an automobile rumble seat of the type provided with a hinged back including a cushion, comprising a plurality of canopy-supporting frame members each of said frame members comprising a rigid bar section, adapted to be disposed in erect positions along said back at opposite ends of the cushion, and canopy-supporting means supported by the upper ends of said bar sections; and detachable clamping frames formed to horizontally engage the front and rear of the seat back and said bar sections above and below the cushion, each clamping frame comprising a pair of parallel rigid bars, and manually operable clamping means connecting their ends to draw the bars toward each other and clamp the canopy-supporting bar sections rigidly to the seat back, said clamping means being adjustable to detach the clamping frame and the canopy-supporting members entirely from the seat back to permit the latter to be folded down.

3. A detachable and collapsible top structure for an automobile rumble seat of the type provided with a hinged back having a cushion on the front face thereof, comprising a plurality of canopy-supporting frame members each of said frame members consisting of a rear vertical rigid bar section, adapted to be disposed in erect position along the vertical side edges of the back, one at each end of the cushion, and canopy-supporting arms carried by the upper ends of said bar sections and extending forward therefrom; detachable clamping frames formed to fit horizontally across the seat back along the upper and lower edges thereof and to clamp the said bar sections to the back, each of said clamping frames comprising a pair of parallel rigid bars arranged to clamp the back between them, and manually operable clamping means connecting the two bars to draw the bars toward each other and thereby clamp the vertical canopy-supporting bar sections rigidly to the seat back, said clamping means being adjustable to detach the clamping frames and the canopy-supporting members entirely from the seat back, one bar of each pair being provided with means to space the said rear vertical bar sections apart to receive a canopy.

In testimony whereof I hereunto affix my signature.

LEOPOLD A. BAUM.